United States Patent [19]

Frankstein

[11] Patent Number: 4,967,848

[45] Date of Patent: Nov. 6, 1990

[54] MOBILE ROOT CROP HARVESTING APPARATUS

[76] Inventor: Boris Frankstein, Etzel Street 62, Apt. 14, Holon 58200, Israel

[21] Appl. No.: 170,578

[22] Filed: Mar. 14, 1988

Related U.S. Application Data

[63] Continuation of Ser. No. 803,307, Nov. 29, 1985, abandoned.

[51] Int. Cl.$^5$ ............................................. A01D 27/00
[52] U.S. Cl. ...................................................... 171/36
[58] Field of Search ......................... 171/26, 27, 31, 36, 171/37, 39

[56] References Cited

U.S. PATENT DOCUMENTS

| | | | |
|---|---|---|---|
| 1,442,963 | 1/1923 | Moore | 171/27 |
| 2,061,395 | 11/1936 | Daniels et al. | 171/36 |
| 2,102,379 | 12/1937 | Nutter | 171/36 X |
| 2,357,810 | 9/1944 | Christiansen | 171/36 |
| 2,418,575 | 4/1947 | Christiansen | 171/36 |
| 2,833,357 | 5/1958 | Lust | 171/37 |
| 3,451,485 | 6/1969 | James | 171/36 |
| 3,603,363 | 9/1971 | Frankshtein | 171/36 X |

FOREIGN PATENT DOCUMENTS 1921638  12/1970  Fed. Rep. of Germany ........ 171/36

OTHER PUBLICATIONS

"Mobile Root Crop Harvesting Apparatus", Patents and Designs Journal, Israel State Records, Aug. 1985, p. 1243.

Primary Examiner—Robert A. Hafer
Assistant Examiner—S. Rimell
Attorney, Agent, or Firm—Benjamin J. Barish

[57] ABSTRACT

Harvesting apparatus comprising a chassis, apparatus for loosening the roots of a crop from the ground, conveyor apparatus for engaging crops and transporting them to a first location, and haulm cutting apparatus engaging the crops at the first location and being operative for separating the haulm from the remaining portion of the crops, the haulm cutting apparatus comprising a pair of cooperating, counter-rotating, generally parallel disposed augers, having screw threads formed thereon, the augers being configured to define a broadened entrance region wherein the screw threads of the pair of augers are separated from each other by a separation which exceeds the separation between the solids of rotation defined by rotation of the augers.

14 Claims, 6 Drawing Sheets

MOBILE ROOT CROP HARVESTING APPARATUS

This application is a continuation, of application Ser. No. 803,307, filed Nov. 29/85, now abandoned.

FIELD OF THE INVENTION

The present invention relates to crop harvesting machines and more particularly to harvesting machines employing cooperating augers for feeding the crops.

BACKGROUND OF THE INVENTION

Root crop harvesting machines of the type employing cooperating augers for feeding the root crops to a haulm cutting knife are known in the art. One such device is shown in applicant's U.S. Pat. No. 3,603,363, issued Sept. 7, 1971.

Experimentation with root crop harvesters of the type described in the aforesaid U.S. Pat. No. 3,603,363 have drawn attention to a deficiency in such devices, namely that the crops tend not to enter into engagement with the augers, thus clogging the apparatus and therefore rendering it ineffective in feeding the root crops to the haulm cutting knife.

Attempts have been made, unsuccessfully, to overcome this deficiency. Applicant is not aware of the successful incorporation of such an auger drive into a commercial harvester.

SUMMARY OF THE INVENTION

The present invention seeks to overcome the above-described limitation of the prior art root crop harvesting machines and to provide a root crop harvesting machine which does not tend to become clogged due to poor feeding to the augers.

The invention thus provides harvesting apparatus comprising: a chassis; means for loosening the roots of crops from the ground; pick-up conveyor means having an input end and an output end for engaging crops and transporting them to a first location; and crop feeding means disposed at the first location and including a pair of cooperating, counter-rotating, generally parallel disposed augers having screw threads formed thereon and defining geometrical solids of rotation, the augers being configured to define a broadened entrance region wherein the screw threads of the pair of augers are separated from each other by a first longitudinal separation, the screw threads of the pair of augers at longitudinal locations outside of the broadened entrance region being separated from each other by a second longitudinal separation, less than the first longitudinal separation.

In accordance with one preferred embodiment of the present invention, the entrance region is defined by increasing the pitch of the screw threads thereat, thereby increasing the spacing between adjacent screw threads on an auger at the entrance region. According to a second embodiment, the entrance region is defined by reducing the radius of some of the screw threads in the entrance region. According to a third embodiment, the entrance region is defined both by increasing the pitch as aforesaid and by reducing the radius of the screw threads.

Further in accordance with a preferred embodiment of the present invention, there is provided auxiliary conveyor means at the first location for assisting in feeding crops from the conveyor apparatus to the haulm cutting apparatus.

Additionally in accordance with a preferred embodiment, the augers of the haulm cutting apparatus are located at the first location in operative engagement with the output end of the conveyor apparatus and underlying the auxiliary conveyor means.

Further in accordance with a preferred embodiment of the present invention, the augers are configured to maintain the haulms in a generally vertical disposition.

Additionally in accordance with a preferred embodiment of the present invention, the augers are configured such that the screw threads define uneven surfaces for enhanced engagement with the crops.

Further in accordance with a preferred embodiment of the present invention, the augers are each configured at an exit zone with screw threads spiralling in a direction opposite to the direction thereof along the remainder of the operative length thereof to enhance disengagement of the crops therefrom.

Additionally in accordance with an embodiment of the present invention mechanized removal means are associated with the haulm cutting apparatus for removing the cut haulms from the vicinity of the augers.

Further in accordance with an embodiment of the invention, the apparatus for loosening comprises a digger which is off-center mounted on a digger support for preventing accumulation of soil and weeds thereon.

Additionally in accordance with an embodiment of the invention, means is provided for lifting the haulms onto the pick-up conveyor and for regulating the force applied to the haulm lifters.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
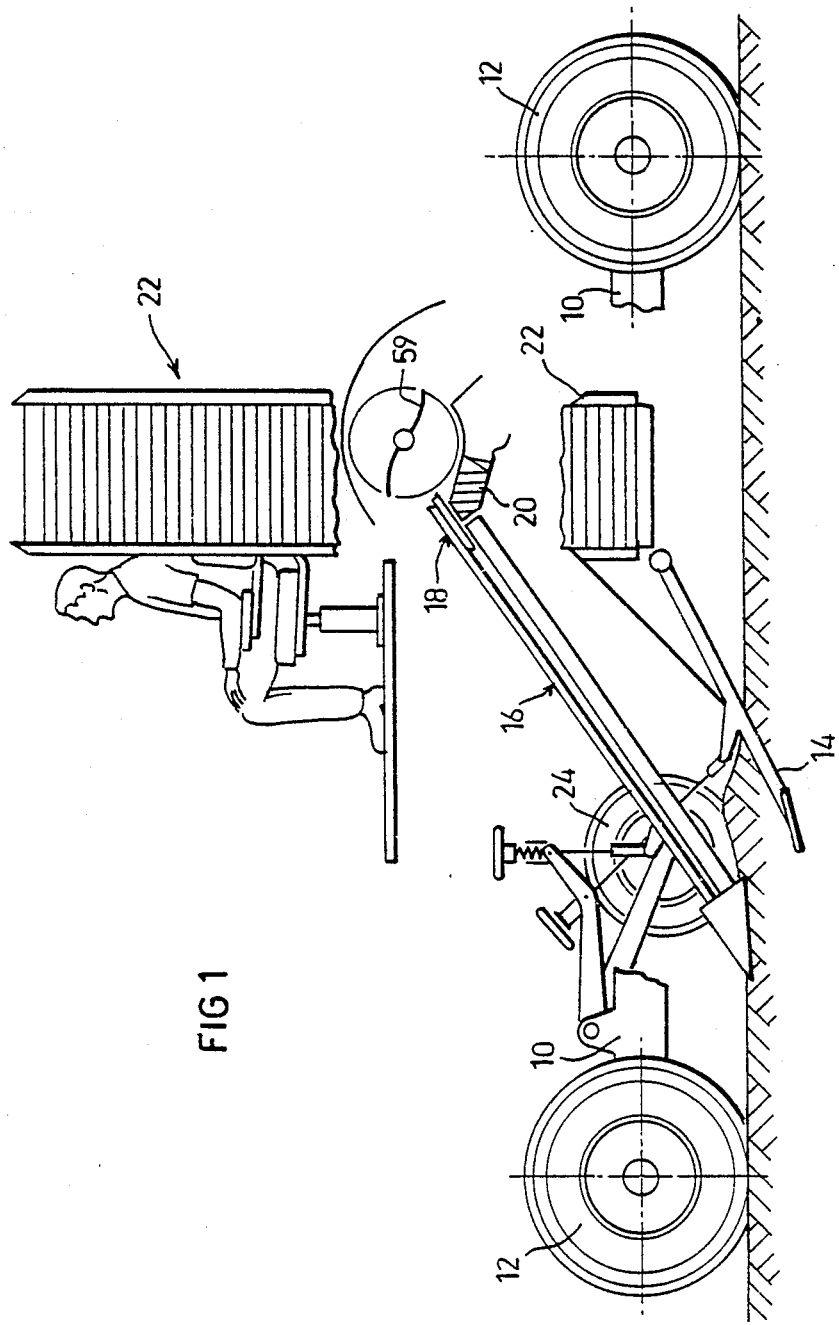
FIG. 1 is a general, schematic side view illustration of a harvesting machine constructed and operative in accordance with a preferred embodiment of the present invention.
Figure 2:
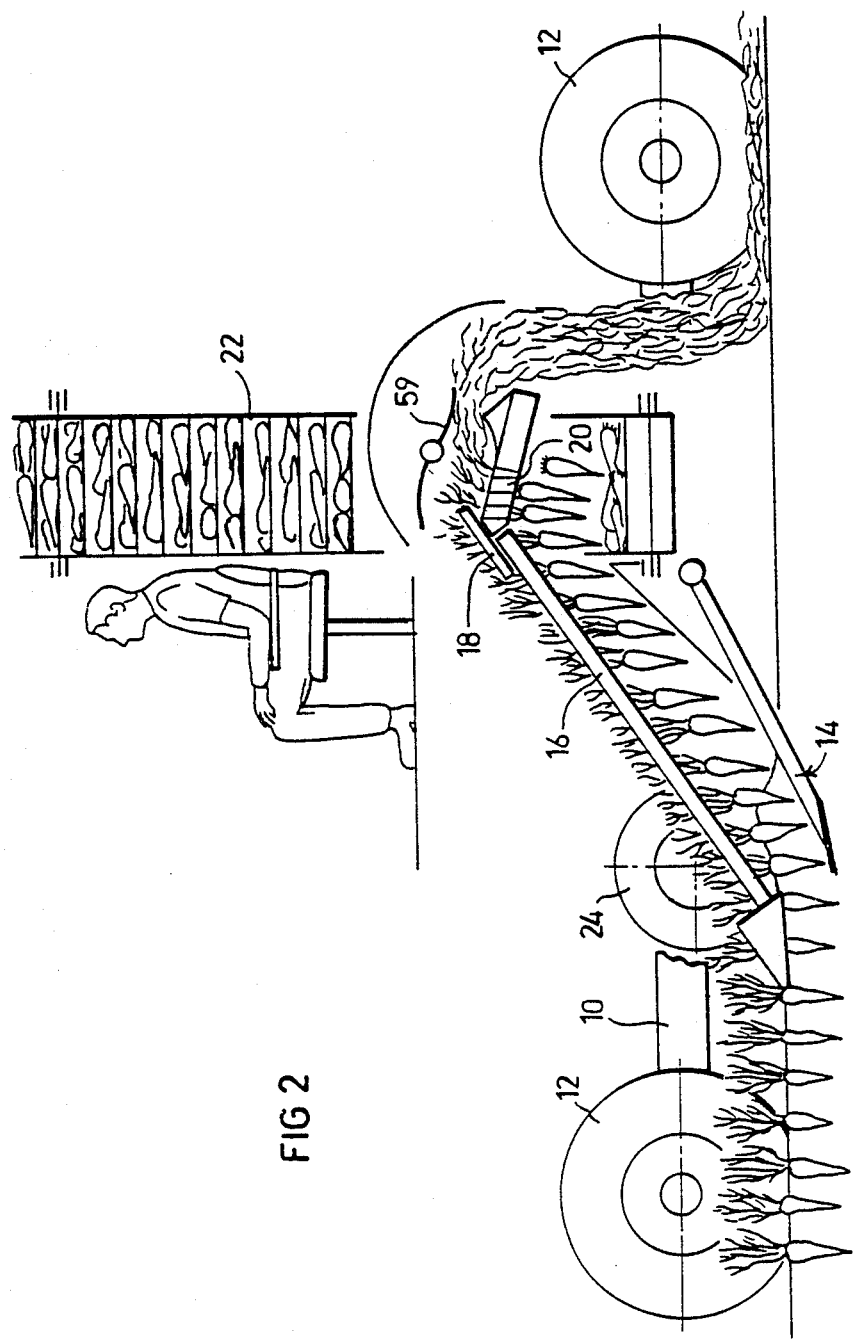
FIG. 2 is a functional side view illustration corresponding in view to FIG. 1 and illustrating the operation of the apparatus of FIG. 1.
Figure 3:
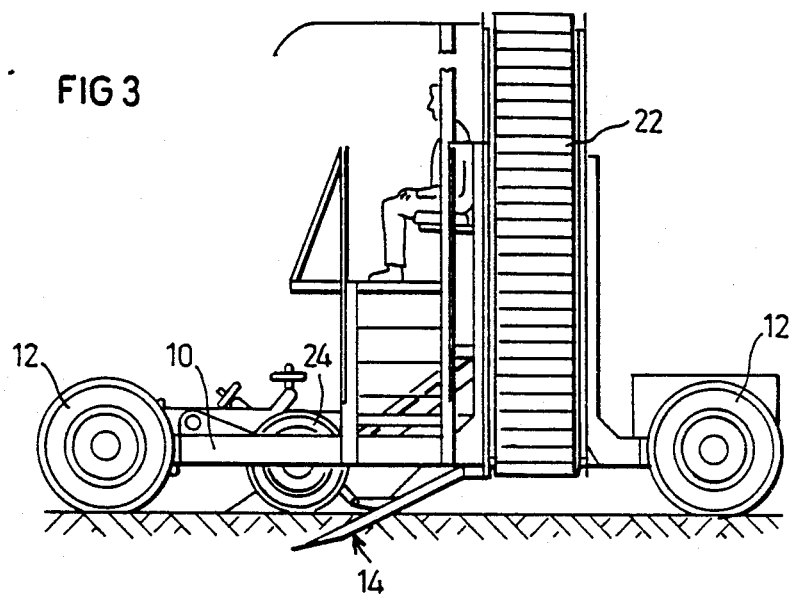
FIG. 3 is a more complete side view illustration corresponding to FIG. 1.
Figure 4:
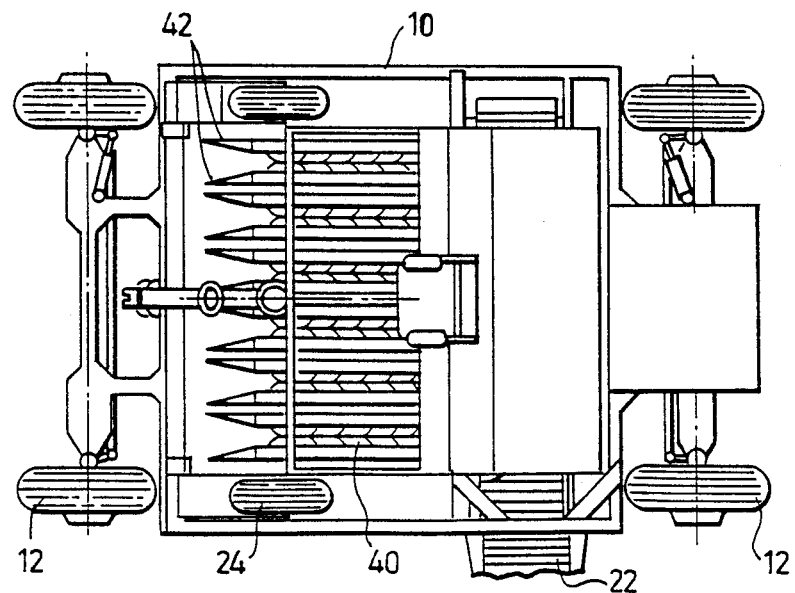
FIG. 4 is a top view illustration of the apparatus of FIGS. 1 and 3.

Reference is now made to FIGS. 1–4, which illustrate harvesting apparatus constructed and operative in accordance with a preferred embodiment of the present invention comprising a chassis 10 typically mounted on four wheels 12. Mounted on the chassis is apparatus for loosening crop roots, indicated generally by reference numeral 14, a plurality of parallel disposed pick-up conveyors 16, a plurality of auxiliary conveyors 18, each disposed at the output end of each pick-up conveyor 16, a haulm cutting assembly 20 associated with each pick-up conveyor, and a crop collection and transfer conveyor 22.

Figure 5:
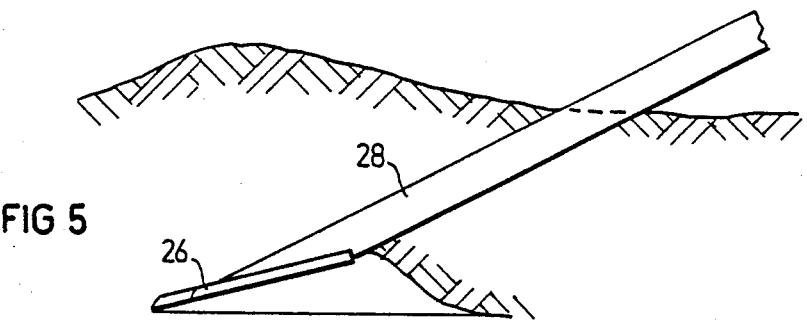
FIG. 5 is a side view illustration of root loosening apparatus in operative ground engagement.
Figure 6:
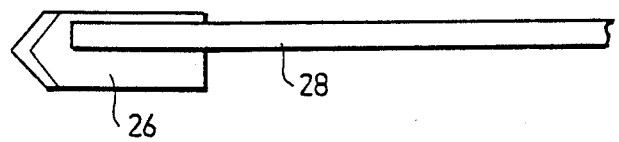
FIG. 6 is a top view illustration of the off-center mounting of the root loosening apparatus of FIG. 5.
Figure 16:
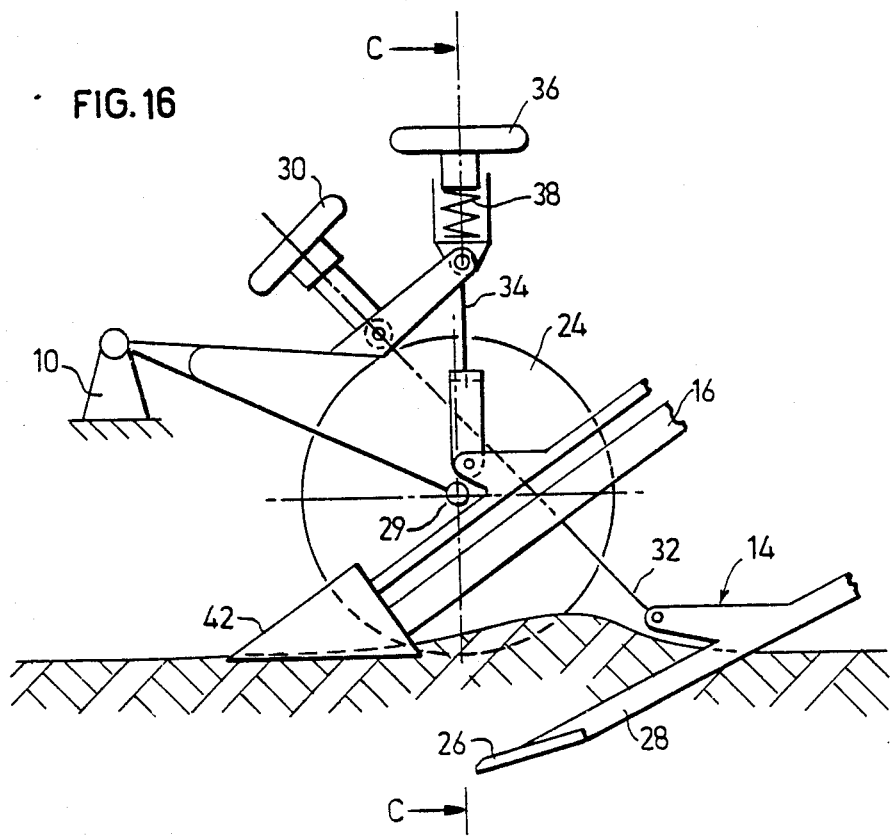
FIG. 16 is an illustration of the mounting assembly for the root loosening apparatus of FIGS. 1–4.
Figure 17:
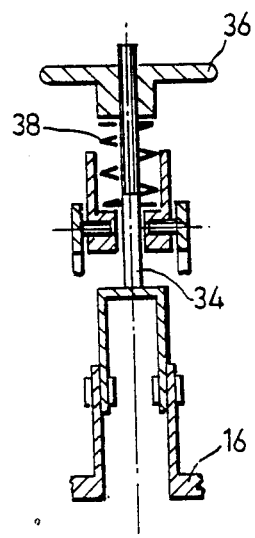
FIG. 17 is a sectional illustration of the apparatus of FIG. 16, taken along lines C—C on FIG. 16.

The mounting assembly for the bottom of the pick-up conveyor 16 and for the root loosening apparatus 14 is illustrated in FIG. 16 and is seen to comprise a pair of ground following wheels 24, which are pivotably mounted onto the chassis 10, as indicated schematically in FIG. 16. A digger blade 26 is associated with each pick up conveyor 16 and is arranged to move along with the chassis below the ground surface in order to loosen the roots of crops and is mounted on a mounting shaft 28, as shown in FIGS. 5 and 6. It is a particular feature of the construction of the root loosening apparatus that the shaft 28 is mounted off center with respect to blade 26, such that soil and other material do not tend to collect in front of shaft 28 as it moves through the soil.

The depth of blade 26 is determined with respect to the axis 29 of the ground following wheels 24 by means of adjustment of a threaded knob 30 which governs the effective length of a mounting shaft 32 which supports mounting shaft 28. The height of the bottom end of pick-up conveyor 16 is determined with respect to the axis 29 by means of a similar shaft 34 and associated spring loaded knob 36. Compression of the spring 38 associated with knob 36 causes raising of the bottom end of the pick-up conveyor 16.

Figure 7:
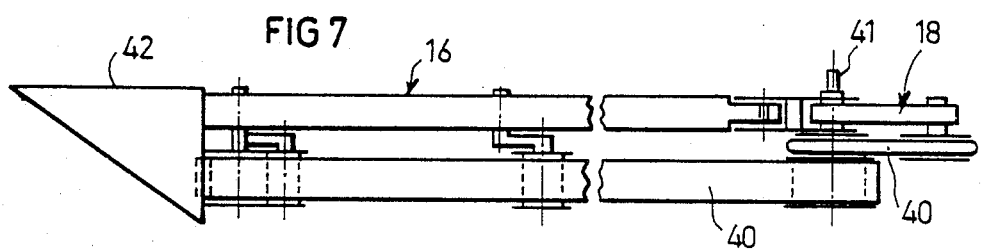
FIGS. 7 and 8 are respective side and top view illustrations of conveyor apparatus employed in the apparatus of FIGS. 1–4.
Figure 8:
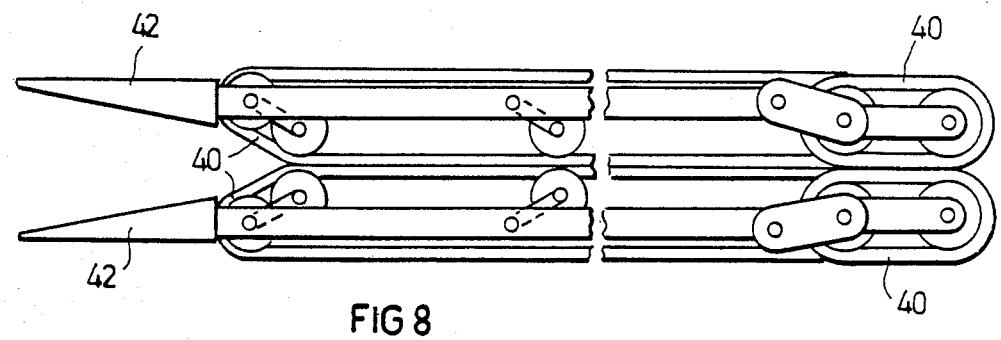

Reference is now made to FIGS. 7 and 8 which illustrate the pick-up conveyor 16 and the auxiliary conveyor 18, which overlies the pick-up conveyor 16 at the output end thereof. Both the pick-up conveyor 16 and the auxiliary conveyor 18 are of the squeeze belt type, employing two cooperating belts 40 which are driven in synchronization and hold the haulms of the crops in frictional engagement therebetween. As seen in FIG. 7, both conveyors 16 and 18 are preferably driven by the same power source, which provides for synchronization therebetween. The power connection to the conveyors is via a common drive shaft 41. Lifters 42 serve to guide the crops into engagement with belts 40.

Figure 9:
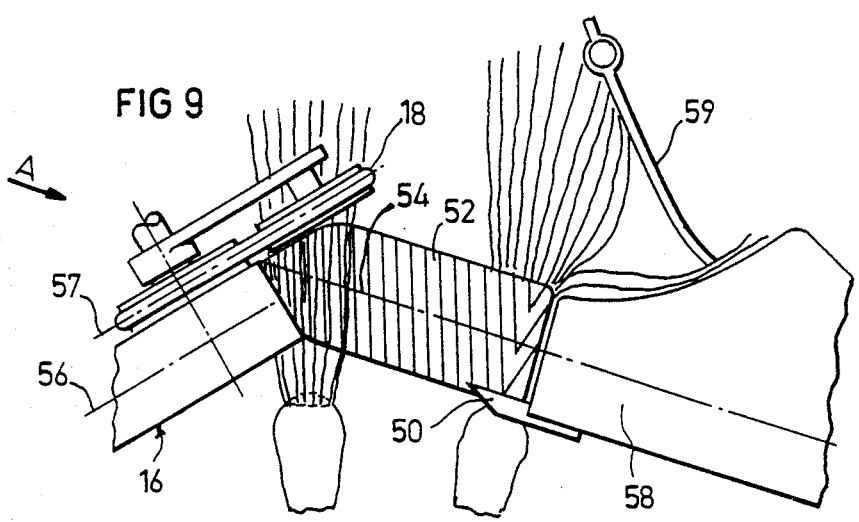
FIG. 9 is a general side view illustration of haulm cutting apparatus forming part of the apparatus of FIGS. 1–4.
Figure 10:
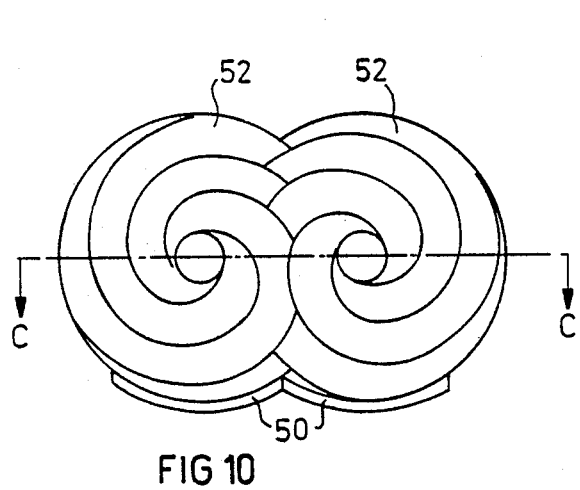
FIG. 10 is an front view illustration taken in the direction "A" indicated on FIG. 9.

Reference is now made to FIGS. 9–15, which illustrate the haulm cutting apparatus 20 (FIGS. 1,2) of the present invention. Referring initially to FIG. 9, it is seen that the haulm cutting apparatus comprises a fixed knife 50 which is operative to cut off the haulm of crops such as root crops which are fed thereto preferably in upstanding orientation by means of a pair of cooperating feeding augers 52.

According to a preferred embodiment of the invention, the orientation of the augers 52 is as shown in FIG. 9 with respect to the output end of pick-up conveyor 16 and auxiliary conveyor 18. Specifically, the longitudinal axes 54 of the augers are arranged at approximately 45 degrees with respect to the longitudinal travel axes 56 and 57 of conveyors 16 and 18. This arrangement provides accurate upstanding feeding of the haulms of the crops from conveyor 16, with the assistance of conveyor 18, into engagement with the augers 52. Augers 52 are rotated in synchronized opposite direction rotation by a power source (not shown) via a gear box 58.

A rotating pushing device 59 is provided above augers 52 for assisting in the removal of the cut haulms from the region of the augers, so that the cut haulmes may fall to the ground.

The construction of the augers 52 will now be described in detail, it being noted that it is a particular feature of the present invention that an enlarged entrance region is defined between the two cooperating augers for initial engagement of the haulms without clogging. The enlarged entrance region is provided by configuring the screw threads of the pair of augers, and more particularly their outer edges, to be separated from each other by a separation which exceeds the separation between the solids of rotation 60 defined by rotation of the auguers.

The enlarged entrance region is attained by one or both of the following design techniques:

a. The pitch of the screw thread is increased at the entrance region.

b. The entrance region is defined by cutting down, or reducing the radius of some of the screw threads in the entrance region.

According to a third embodiment, the entrance region is defined both by increasing the pitch as aforesaid and by cutting down, or reducing the radius of the screw threads.

Figure 11:
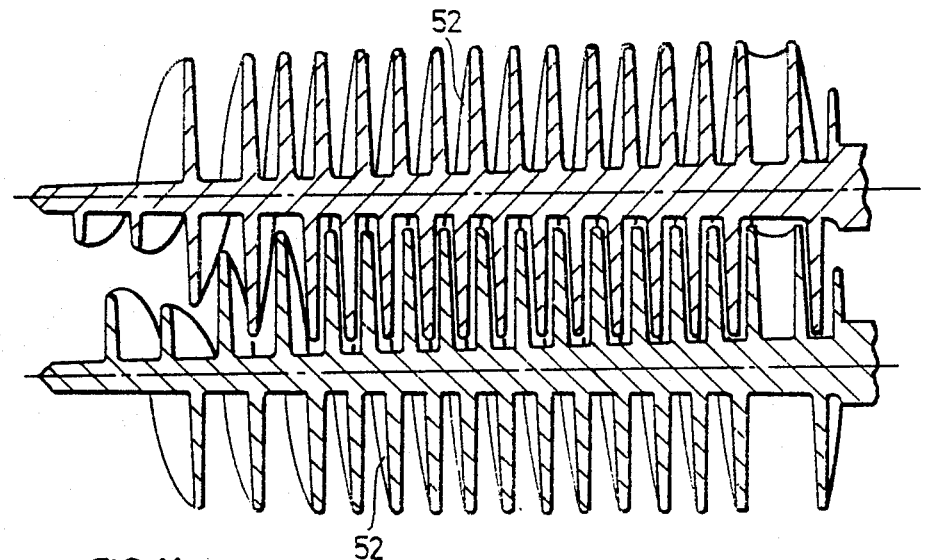
FIG. 11 is a sectional illustration taken along the lines "C—C" indicated on FIG. 10.
Figure 12:
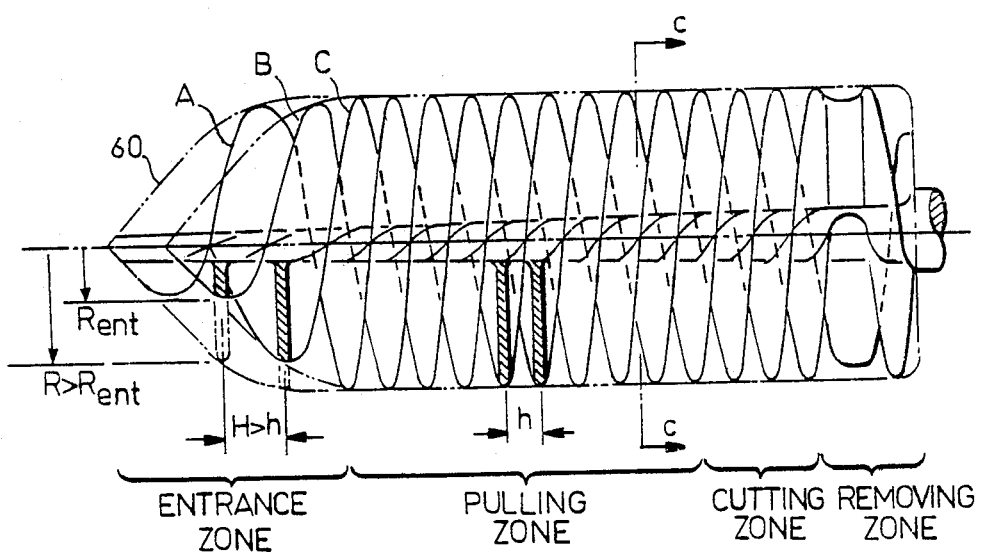
FIG. 12 is an illustration of one of the augers shown in FIG. 11 which is marked to show various features of the auger construction.

The third embodiment, and inherently, the first and second embodiments are shown in FIGS. 11 and 12. Dashed lines 60 illustrate the outer profile of an ordinary single spiral screw thread. In the entrance region of the auger, it is seen that:

1. The radius Rentrance of the edge of one or more screw threads is less than the radius indicated by dashed line 60 and less than the radius R in the remainder of the auger; and 2. The separation H (pitch between adjacent screw thread edges) is greater than the separation h in the remainder of the auger.

In the illustrated embodiment, these two features are realized by the expedient of employing a multiple spiral screw thread. In the illustrated example of FIG. 12, a triple spiral screw thread is employed including spirals A, B and C. It is noted that the radius of the edge of the screw thread spirals B and C is cut off in the entrance region, while that of spiral A is not.

FIGS. 9, 11 and 12 also illustrate another feature of the present invention, whereby in the removing zone, the screw thread is spiralled in a sense or direction opposite to that in which it is configured along the remainder of the auger.

Figure 14:
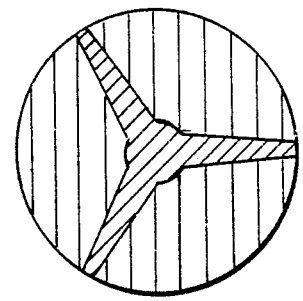
FIGS. 14 and 15 illustrate two alternative conditioning configurations on the auguer surfaces and are taken along the lines "C—C" on FIG. 12.
Figure 13:
FIG. 13 is an enlarged sectional illustration of the screw threads of the augers of FIGS. 10–12 showing the conditioned surface thereof.
Figure 15:
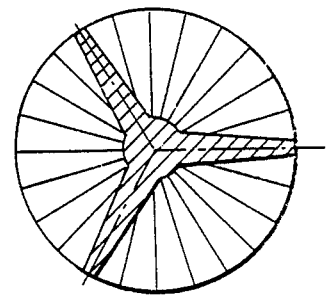

Referring now to FIGS. 13–15, there is illustrated conditioning of the surfaces of the screw threads, as by means of a grooved configuration shown in enlarged form FIG. 13. For the sake of understanding it may be appreciated that the scale of FIG. 13 is typically about two times that of FIG. 12. This grooved configuration provides enhanced gripping of the haulmes by the auger and may be arranged in a number of possible orientations, two of which are illustrated in FIGS. 14 and 15. FIG. 15 illustrates a configuration wherein the peaks and valleys of the grooves extend radially outward, while FIG. 14 illustrates a configuration wherein the grooves are generally linearly disposed.

It will be appreciated by persons skilled in the art that the present invention is not limited by what has been particularly shown and described hereinabove. Rather the scope of the present invention is defined only by the claims which follow:

I claim:

1. Harvesting apparatus comprising:
   a chassis;
   means for loosening the roots of crops from the ground;
   pick-up conveyor means having an input end and an output end for engaging crops and transporting them to a first location; and
   crop feeding means disposed at said first location and including a pair of cooperating, counter-rotating, generally parallel disposed augers having screw threads formed thereon and defining geometrical solids of rotation, the augers being configured to define a broadened entrance region wherein the screw threads of the pair of augers are separated from each other by a first longitudinal separation, the screw threads of the pair of augers at longitudinal locations outside of the broadened entrance region being separated from each other by a second longitudinal separation, less than said first longitudinal separation.

2. Harvesting apparatus according to claim 1 wherein said crops include haulms and also comprising haulm cutting means engaging the crops at the first location and being operative for separating the haulm from the remaining portion of the crops, said haulm cutting means comprising a haulm cutting knife to which crops are fed by said feeding means.

3. Harvesting apparatus according to claim 1 and wherein said entrance region is also defined by reducing the radius of some of the screw threads so that their edges lie radially inwardly of the geometrical solid of rotation defined by rotation of the auger.

4. Harvesting apparatus according to claim 1 and wherein said entrance region is also defined by screw threads which have a pitch greater than the adjacent pitch of the screw threads along the remainder of the auger.

5. Harvesting apparatus according to claim 1 and wherein said entrance region is also defined by screw threads which have a pitch greater than the adjacent pitch of the screw threads along the remainder of the auger and by reducing the radius of some of the screw threads so that their edges lie radially inwardly of the geometrical solid of rotation defined by rotation of the auger.

6. Harvesting apparatus according to claim 1 and also comprising auxiliary conveyor means at the first location for assisting in feeding crops from the conveyor means to the feeding means.

7. Harvesting apparatus according to claim 6 and wherein said augers are located at the first location in operative engagement with the output end of the conveyor means and underlying the auxiliary conveyor means.

8. Harvesting apparatus according to claim 2 and wherein said augers are configured to maintain the haulms in a generally vertical disposition.

9. Harvesting apparatus according to claim 1 and wherein said screw threads have uneven surfaces for enhanced engagement with the haulms.

10. Harvesting apparatus according to claim 1 and wherein said augers are each configured at an exit zone with screw threads spiralling in a or direction opposite to the or direction thereof along the remainder of the operative length of said augers to enhance disengagement of the crops therefrom.

11. Harvesting apparatus according to claim 1 and also comprising mechanized removal means associated with the haulm cutting means for removing the cut haulms from the vicinity of the augers.

12. Harvesting apparatus according to claim 1 and wherein said means for loosening comprises a digger.

13. Harvesting apparatus according to claim 12 and wherein said digger is off-center mounted on a digger support for preventing accumulation of soil and other material thereon.

14. Harvesting apparatus according to claim 1, further comprising haulm lifting means and means for regulating the force applied to the haulm lifting means.

* * * * *